(12) United States Patent
Hayashi (10) Patent No.: US 6,260,271 B1
(45) Date of Patent: Jul. 17, 2001

(54) TUBULAR BODY HAVING INTEGRAL BRANCH TUBES AND METHOD FOR PRODUCING THE SAME

(76) Inventor: Toshiomi Hayashi, 9-1-306, Furuichi 1-Chome, Asaminami-ku, Hiroshima-shi Hiroshima 731-0123 (JP)

( * ) Notice: Subject to any disclaimer, the term of this patent is extended or adjusted under 35 U.S.C. 154(b) by 0 days.

(21) Appl. No.: 09/303,374

(22) Filed: Apr. 30, 1999

(30) Foreign Application Priority Data

May 6, 1998 (JP) ................................. 10-123428

(51) Int. Cl.[7] .......................... B21D 53/06; B23P 15/26
(52) U.S. Cl. ................................. 29/890.035; 29/890.052; 228/164; 228/173.1; 228/173.2; 228/173.4; 228/174
(58) Field of Search ................ 29/890.035, 890.052; 228/146, 164, 173.1, 173.2, 173.4, 174

(56) References Cited

U.S. PATENT DOCUMENTS

| | | | | |
|---|---|---|---|---|
| 2,785,542 | * | 3/1957 | Thomas | 62/511 |
| 4,663,812 | * | 5/1987 | Clausen | 29/890.052 |
| 4,749,033 | * | 6/1988 | Clausen | 165/173 |
| 4,770,240 | * | 9/1988 | Dawson et al. | 165/176 |
| 5,190,101 | * | 3/1993 | Jalilevand et al. | 165/176 |
| 5,337,477 | * | 8/1994 | Waggoner | 29/890.052 |
| 5,419,174 | * | 5/1995 | Waggoner | 72/352 |
| 5,642,640 | * | 7/1997 | Insalaco et al. | 72/334 |
| 5,761,808 | * | 6/1998 | Patel et al. | 29/890.52 |
| 5,829,133 | * | 11/1998 | Joshi et al. | 29/890.043 |
| 6,049,981 | * | 4/2000 | Mashiko | 29/890.052 |
| 6,109,344 | * | 8/2000 | Higgins | 165/174 |
| 6,167,953 | * | 1/2001 | Kobayashi et al. | 165/173 |
| 6,179,049 | * | 1/2001 | Higgins | 165/140 |
| 6,186,225 | * | 2/2001 | Higgins | 165/173 |
| 6,189,213 | * | 2/2001 | Kimura et al. | 29/890.035 |

FOREIGN PATENT DOCUMENTS 10-34748   2/1989 (JP) .

* cited by examiner

*Primary Examiner*—S. Thomas Hughes
*Assistant Examiner*—Essama Omgba
(74) *Attorney, Agent, or Firm*—Muramatsu & Associates (57) ABSTRACT

A tubular body having integral branch tubes for use in a distribution tank of a car air conditioner and a method for producing such tubular body. The tubular body is produced almost solely by a deformation process. The process for forming the tubular body includes a swelling step for swelling the sheet metal at predetermined positions to create cylindrically swelled portions by several stages, a boring step for boring the top end of the swelled portion to create branch tubes, a channel creating step for creating mating channel throughout the whole length of the sheet metal, a rounding step for rounding the sheet metal to form a tube having a desired sectional shape, and a mating step for mating the end of the rounded sheet metal with the mating channel. The production process further includes a divider creating step for dividing the space in the tubular body into a plurality of compartments by squeezing the tubular body. Preferably, the production method further includes a thickness increasing step for increasing the thickness at the mating channel.

11 Claims, 11 Drawing Sheets

TUBULAR BODY HAVING INTEGRAL BRANCH TUBES AND METHOD FOR PRODUCING THE SAME

BACKGROUND OF THE INVENTION

This invention relates to a tubular body having integral branch tubes and is made of a single sheet metal solely by a deformation process and a method for producing the same to be used for forming, for instance, a distribution tank having an inlet and an outlet for a conductive medium flowing therethrough.

Figure 24:
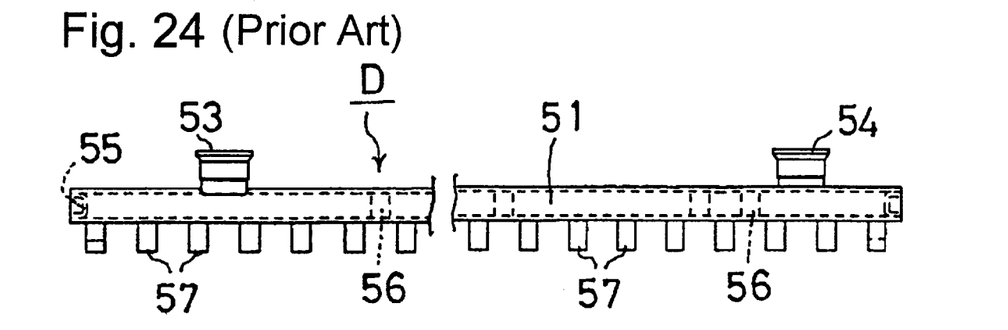
FIG. 24 is a front view of the conventional distribution tank.
Figure 25:
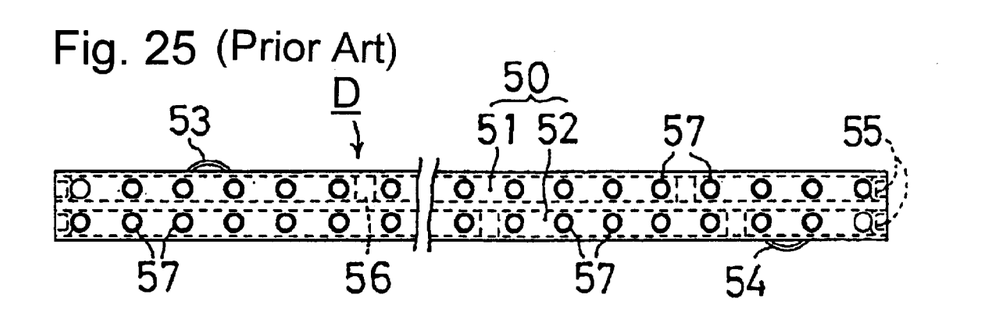
FIG. 25 is a bottom view of the conventional distribution tank of FIG. 24.
Figure 26:
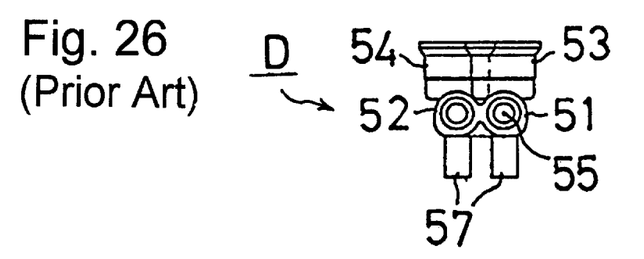
FIG. 26 is a rear view of the conventional distribution tank of FIG. 24.

A distribution tank D for a car air conditioner produced according to the conventional method is shown in FIGS. 24–27. FIG. 24 is a front view, FIG. 25 is a bottom view and FIG. 26 is a rear view, respectively, of the distribution tank D. The main body 50 of the distribution tank D made of light metal is produced by an extrusion process. The main body 50 is formed with two main tubes 51 and 52 connected parallel with each other for flowing the cooling medium therethrough as shown by the FIGS. 25 and 26.

An inlet joint 53 for introducing the cooling medium in the tank D is connected to the left end of the main tube 51, and an outlet joint 54 for flowing out the cooling medium is connected to the right end of the main tube 52. Each end of the main tubes is blocked by stopcocks 55. In order that the cooling medium meanders across these two main tubes, dividing members 56 prepared by a separate process are provided at a plurality of positions to divide the space in both of the main tubes into a plurality of compartments.

A number of protruding branch tubes 57 are provided on the outer surfaces of the two main tubes 51 and 52 at intervals of a predetermined distance. The branch tubes 57 are provided for connecting thereto the ends of a number of the meandering tubes (not shown) for heat exchange.

Figure 27:
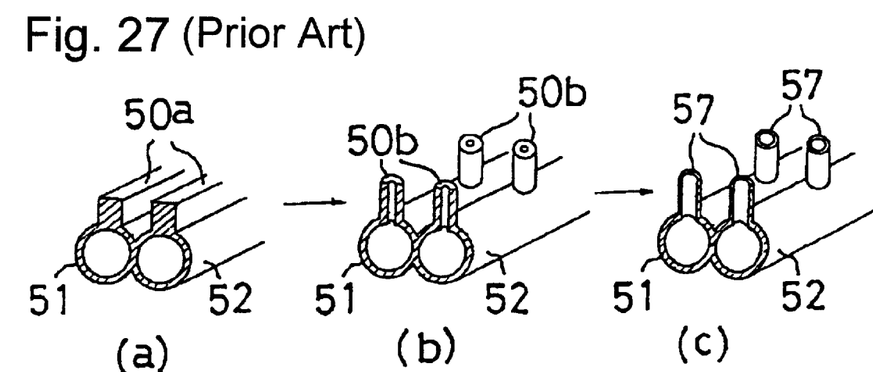

The conventional method of producing the branch tubes 57 is explained with reference to FIG. 27. First, the main body 50 is extruded to form a shape the sectional view of which is shown in FIG. 27(a). Small square pillar bodies 50a are provided on the upper surfaces of the two main tubes 51 and 52 throughout the whole length of the two main tubes.

Next, the small square pillar bodies 50a are cut such that the small circular pillars 50b are left in the longitudinal direction of the main tubes at intervals of a predetermined distance. Then, small penetrating holes are created at the axis of each small circular pillar.

Thereafter, branch tubes 57 having desired inside diameter and length are created by forging in which a deformation process is applied to each small circular pillar 50b. Since this forging process cannot be conducted to many small circular pillars simultaneously, it needs to be separately conducted by small numbers in a plurality of times. In addition, within the category of the deformation process, the productivity of such a forging process is inferior to that of a press working process.

Since the production of the distribution tank D in the conventional method involves inefficient operations, such as cutting the small circular pillars 50b and conducting discontinuous forging processes several times, the production cost of the distribution tank D inevitably becomes high.

SUMMARY OF THE INVENTION

Therefore, it is an object of the present invention to provide a tubular body having integral branch tubes, such as a distribution tank of an automobile air conditioner, which is made of a single sheet metal and produced almost solely by a deformation process based on a press working technology.

It is another object of the present invention to provide a tubular body having a large number of integrally formed branches tubes to be used as a cooling medium distribution tank with low cost and high productivity.

It is a further object of the present invention to provide a production method for producing, with high efficiency and low cost, a tubular body having a large number of integrally formed branches tubes solely by a deformation process.

In order to achieve the above objects, the tubular body of the present invention comprises: a main tubular body formed by deforming a single sheet metal; and branch tubes integrally provided on the main tubular body wherein the branch tubes are created on the outer surfaces of the main tubular body by deforming a part of the sheet metal.

One example of the tubular body is a distribution tank of a heat exchanger of automobiles wherein an inlet and an outlet for heat conductive medium and dividers for distribution of such medium are provided. The main tubular body of the distribution tank is comprised of two main tubes connected parallel to each other. The main tubular body is squeezed at a plurality of positions to create dividers therein.

The production method of the present invention for producing a tubular body having integral branch tubes from a single sheet metal solely by a deformation process is comprised of:

a swelling step for creating a cylindrically swelled portion having a predetermined length and thickness at a predetermined position of the sheet metal through a plurality of processing stages, the top end of which being closed;

a boring step for boring the top end of the swelled portion;

a channel creating step for creating a mating channel extending throughout the whole length of the sheet metal at an optional position in the transversal direction of the sheet metal;

a rounding step for rounding the sheet metal in the transversal direction to form a tubular body having a desired sectional shape; and a mating step for mating the end of the rounded sheet metal with the mating channel.

In order to divide the cavity of the tubular body into a plurality of compartments in the longitudinal direction, it is desirable to have a divider creating step for creating dividers at a plurality of predetermined positions by squeezing the tubular body.

Further, in order to increase the thickness of the portion where the mating channel is created, it is desirable to have a thickness increasing step by pressing the sheet metal toward an inner direction thereof.

Further, it is desirable to have a brazing step for sealing the gaps at the mating positions and dividing positions with melted wax.

According to the present invention, a tubular body having integral branch tubes with a complicated structure such as a distribution tank constituting a heat exchanger of a car air conditioner can be efficiently mass produced.

According to the present invention, the tubular body having integral branch tubes can be completed by press working with high productivity without using a forging process which cannot be continuously conducted in a single production process.

According to the present invention, since it does not require any large scale extruding molds or inefficient cutting processes, production cost can be substantially decreased than that of the conventional production method.

According to the present invention, the cross sectional view of the tubular body is not limited to circle but can be various shapes in cross section such as square, triangle, ellipse or other indefinite shapes.

According to the present invention, the space in the tubular body can be easily divided into a plurality of compartments by squeezing the tubes in the course of the continuous deformation process without requiring the step of inserting the dividing members separately prepared.

According to the present invention as applied to a process of producing automobile air conditioners, the existing facilities can be utilized almost as they are for a brazing process.

According to the present invention as applied to a process of producing distribution tanks of automobile air conditioners, the production cost can be reduced almost by half.

According to the present invention, a tubular body of different shape can be easily formed such as a one having a plurality of tubes bundled together.

BRIEF EXPLANATION OF THE DRAWINGS

FIGS. 27(a)–27(c) are diagrams for explaining the production process of the conventional distribution tank of FIG. 24.

DETAILED EXPLANATION OF THE INVENTION

With reference to FIGS. 1–21, an embodiment of the present invention is explained in which the feature of the present invention is applied to a distribution tank of an automobile air conditioner heat exchanger. The distribution tank in the embodiment is a tubular body having integral branch tubes.

Figure 1:
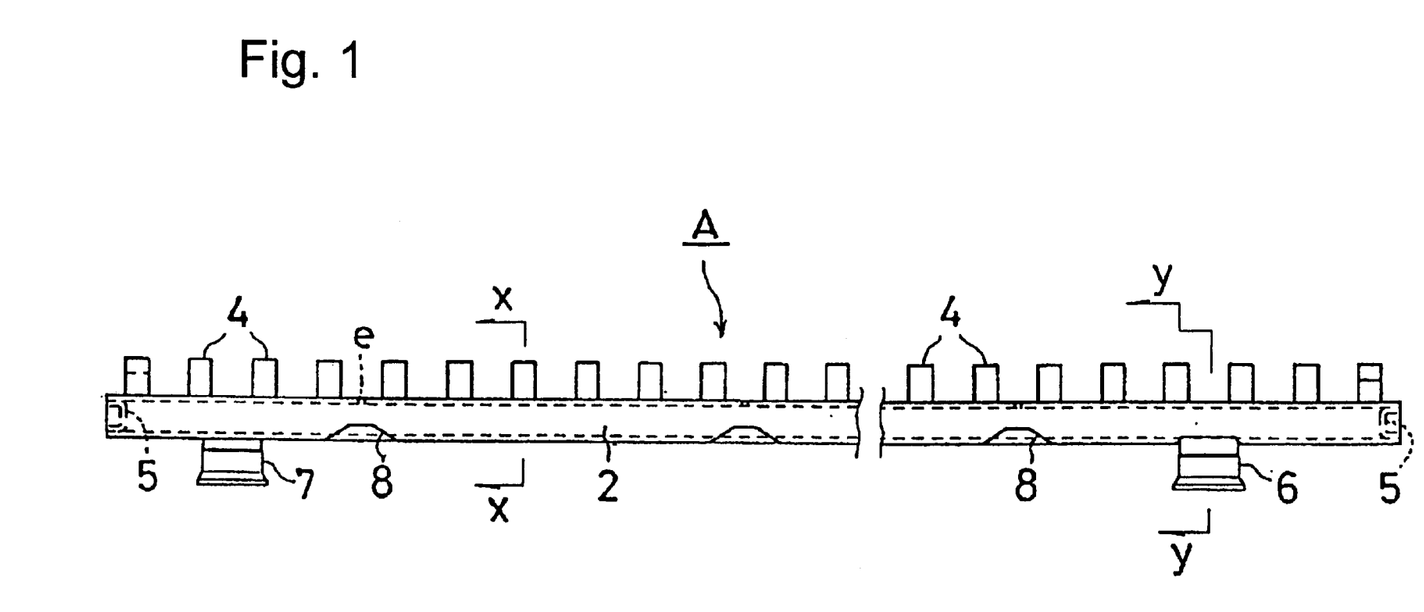
FIG. 1 is a front view of the distribution tank of a heat exchanger for an automobile air conditioner showing an embodiment of the present invention.
Figure 2:
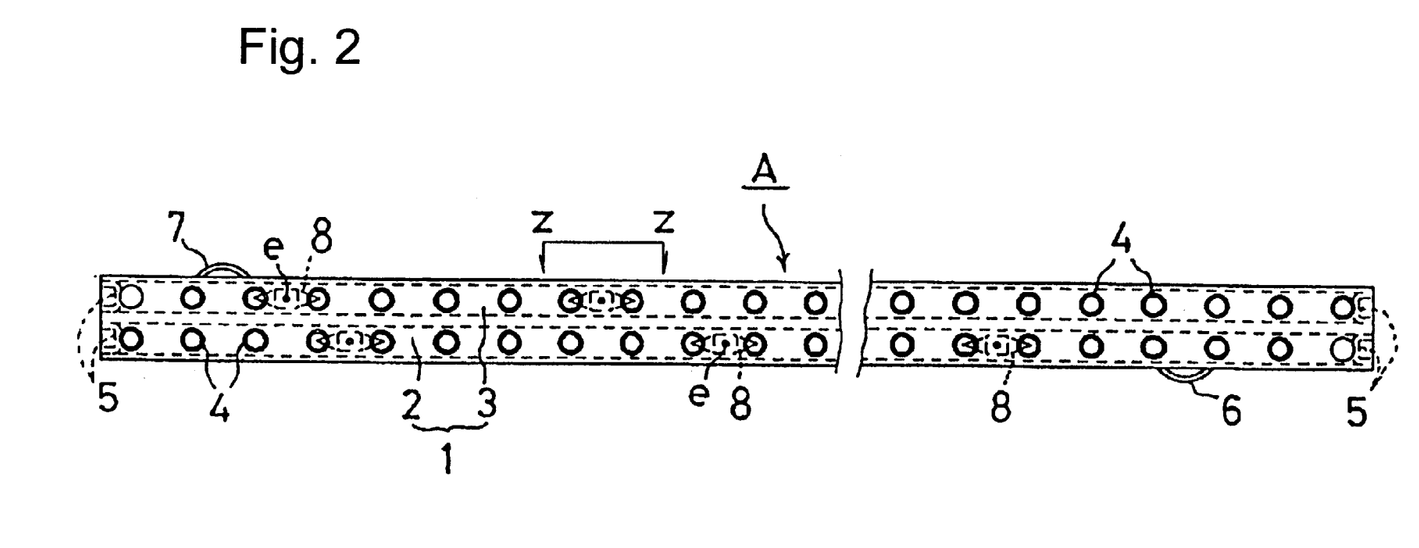
FIG. 2 is a top view of the distribution tank of the heat exchanger in the embodiment of FIG. 1.

The distribution tank A as shown in FIGS. 1 and 2 is made of a single sheet metal. While the conventional distribution tank is produced by cutting or forging the extruded materials as described above, the main tubular body having integral branch tubes of the present invention is formed almost solely by a deformation process (press working).

The basic structure of the distribution tank A is the same as that of the conventional distribution tank D of FIGS. 24 and 25. Namely, the main body 1 of the distribution tank A of the present invention has two main tubes integrally formed in a parallel fashion. There are provided with a plurality of branch tubes 4 protruding on the upper surfaces of the main tubes 2 and 3 as shown in FIGS. 1 and 2. These branch tubes 4 are positioned at an interval of a predetermined distance. Each branch tube 4 has a hole which establishes a path to the inner space of the main tube.

In addition, there are provided with an inlet joint 6 for introducing a cooling medium at the right bottom end of the main tubular body 2. An outlet joint 7 for the cooling medium flowing out is provided at the left end of the bottom surface of the main tubular body 3 as shown in FIGS. 1 and 2.

Figure 3:
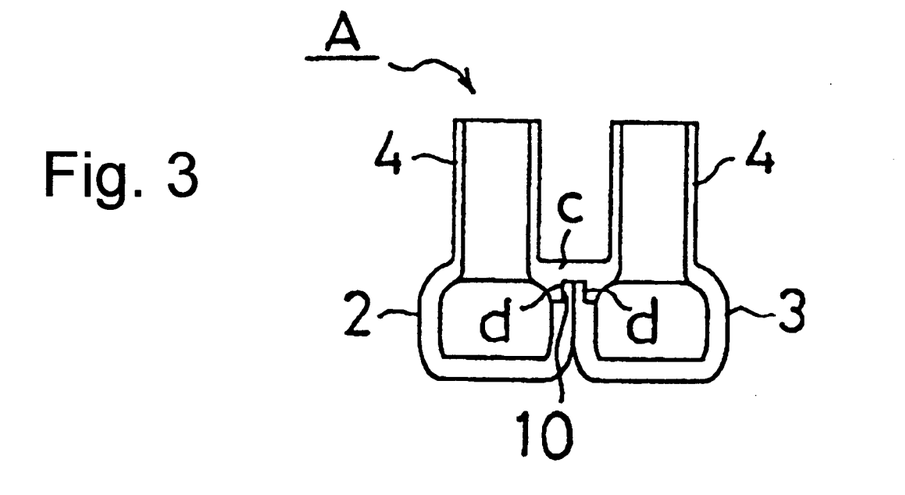
FIG. 3 is a longitudinal sectional view of the distribution tank of the embodiment of the present invention taken along the line X—X of FIG. 1.

FIG. 3 is a longitudinal sectional view of the distribution tank A taken along the line X—X of FIG. 1. The branch tubes 4 are integrally formed with the main tubes 2 and 3. FIG. 3 also shows a structure in which the main tubes 2 and 3 are rounded and fitted in a mating channel denoted by reference numeral 10.

Figure 4:
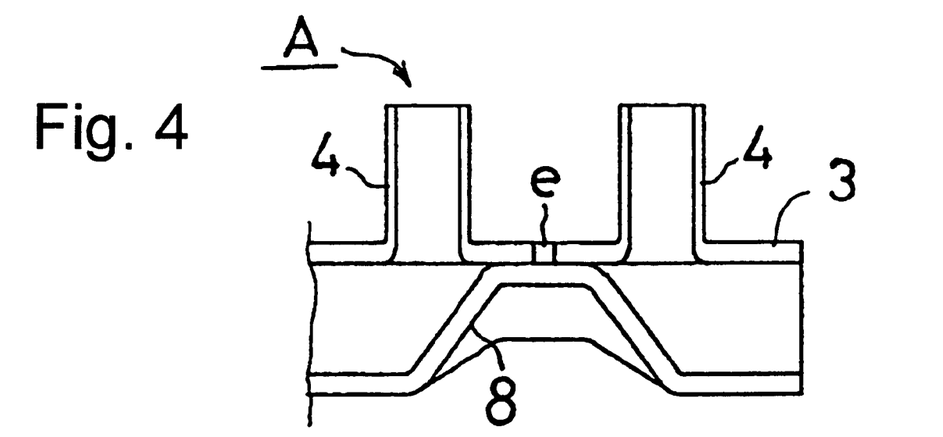
FIG. 4 is a longitudinal sectional view of the main tube 3 of the distribution tank in the embodiment of the present invention taken along the line Z—Z of FIG. 2.

FIG. 4 is the longitudinal section view of the distribution tank A taken along the line Z—Z of FIG. 2. In order to divide the space in the two main tubes 2 and 3 into a plurality of compartments, dividers 8 are created at a plurality of positions in the space by squeezing the main tubular body as shown in FIG. 4.

Figure 5:
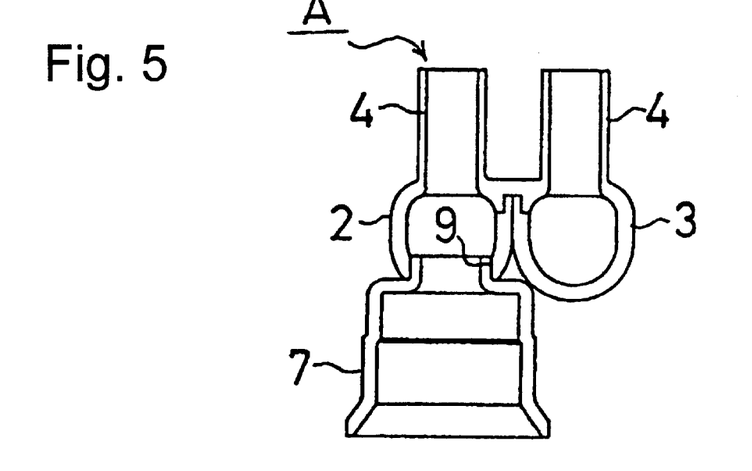
FIG. 5 is a longitudinal sectional view of the distribution tank of the present invention taken along the line Y—Y of FIG. 1.

FIG. 5 is the longitudinal sectional view of the distribution tank A viewed along the line Y—Y of FIG. 1. In this example, the inlet joint 6 (or outlet joint 7) is connected to the main tube at the bottom thereof.

Next, referring to FIGS. 6–21, the method of producing the distribution tank A in accordance with the present invention from a single sheet metal by press working is explained in the following.

The length and width of the sheet metal B is set longer than the length and perimeter of the distribution tank A by a predetermined dimension. The stopcock 5 and the inlet joint 6 and the outlet joint 7 are separately prepared and will be attached to the locations shown in FIGS. 1 and 2 prior to a brazing process for sealing the joint portion of the main body 1.

Figure 6:
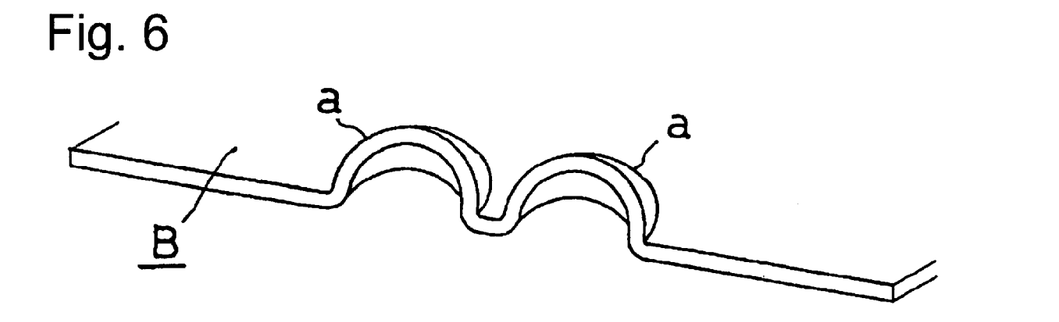
FIG. 6 is a partial perspective view of the longitudinal section of the sheet metal after the first swelling process.

The deformation process of the present invention starts by a drawing process as shown in FIG. 6 wherein a plurality of swelled portions a are produced at the positions where the branch tubes 4 on the distribution tank A are formed as shown in FIG. 2 (first swelling process). The swelled portions are almost hemisphere shaped, the radius of which is larger than that of the branch tubes 4 by a predetermined degree. Accordingly, the interval between the swelled portions forming two rows are significantly larger than the interval between the two rows of the completed branch tubes 4.

Figure 7:
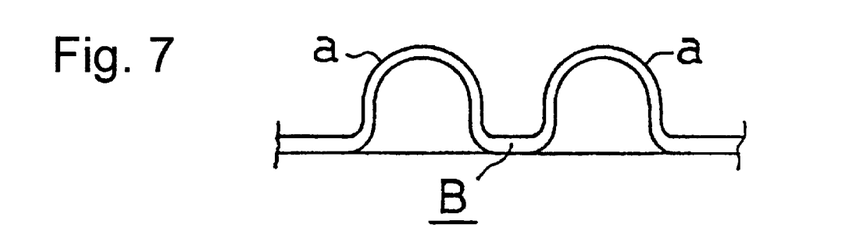
FIG. 7 is a partial longitudinal sectional view of the sheet metal in the transversal direction after the second swelling process.

Next, the second drawing process is conducted such that the diameter of each hemisphere shaped swelled portion is reduced and the height of the swelled portion is increased. Consequently, the shape of the swelled potion becomes similar to that of the branch tubes 4 as shown in FIG. 7 (second swelling process).

Figure 8:
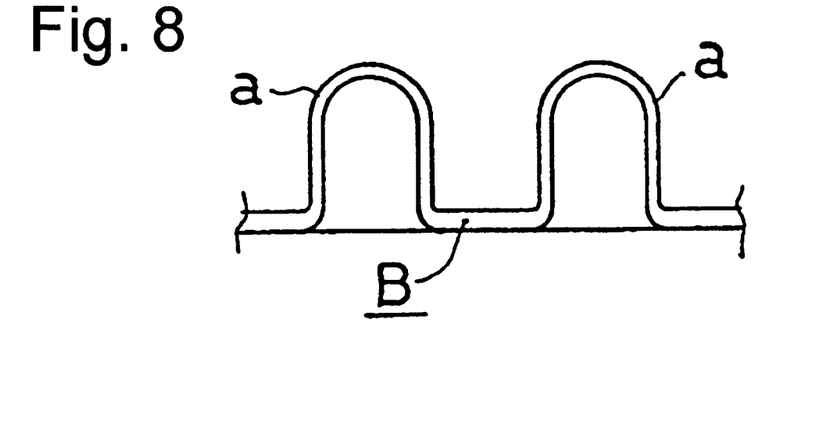
FIG. 8 is a partial longitudinal sectional view of the sheet metal in the transversal direction after the third swelling process.
Figure 9:
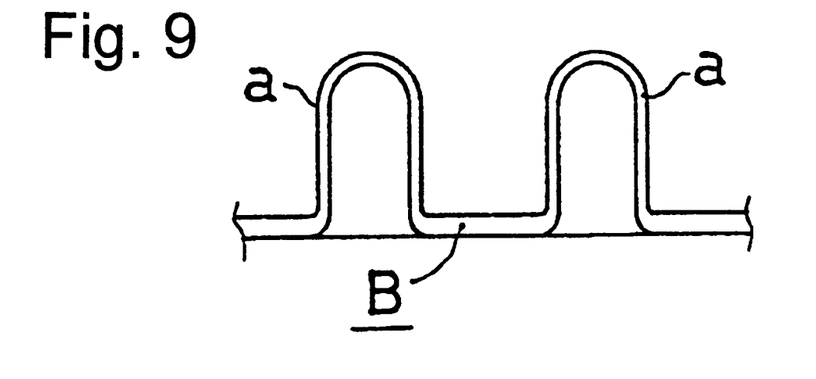
FIG. 9 is a partial longitudinal sectional view of the sheet metal in the transversal direction after the fourth swelling process.

Subsequently, the third and fourth drawing processes as shown in FIGS. 8 and 9 are conducted for the same purpose (third and fourth swelling process).

Figure 10:
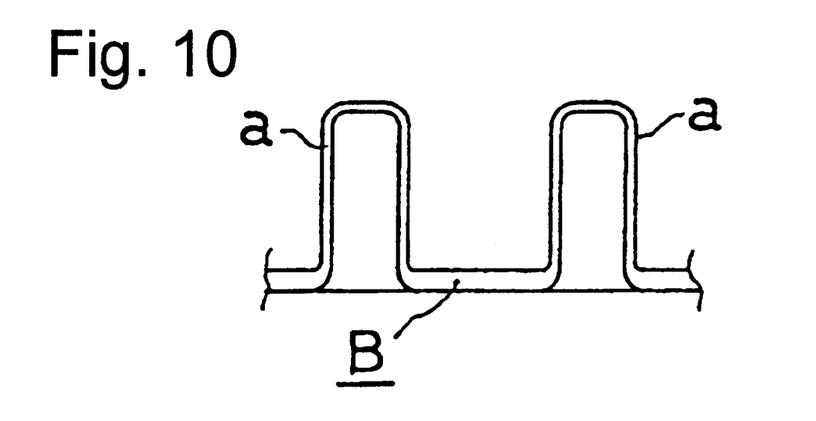
FIG. 10 is a partial longitudinal sectional view of the sheet metal in the transversal direction after the fifth swelling process.

Next, the fifth drawing process is conducted such that the diameter of the swelled portion a is reduced to the same size of the diameter of the branch tubes 4 as in FIG. 10. Also, the top end of the swelled portion is flattened (fifth swelling process).

Figure 11:
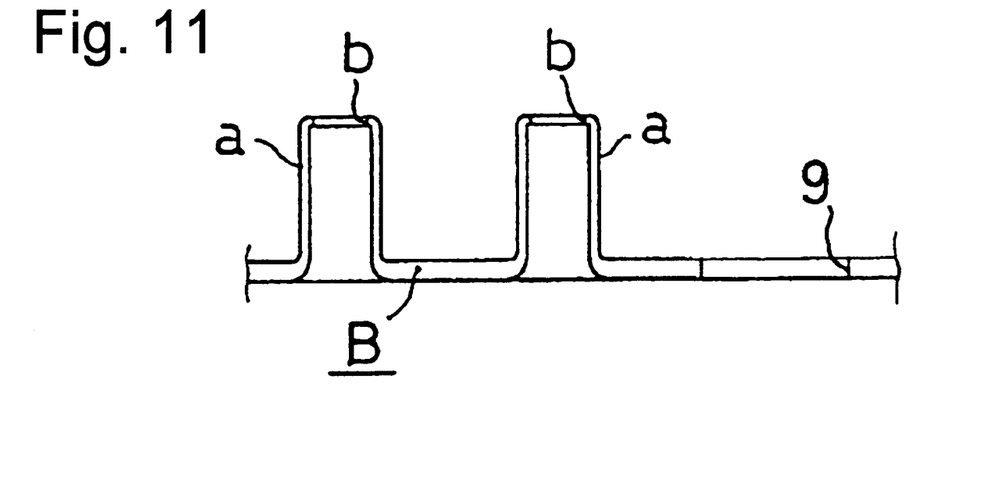
FIG. 11 is a partial longitudinal sectional view of the sheet metal in the transversal direction after top ends of the swelled portions are made flat and bored holes are created therein.

Subsequently, in FIG. 11, press working is further conducted so that the top end of the swelled portion becomes almost completely flat. A boring process is performed to create a hollow b while leaving the surrounding portions (boring process). Also in the boring process, mating holes 9 for receiving the inlet and outlet joints 6 and 7 are created at the predetermined positions of the distribution tank A.

Figure 12:
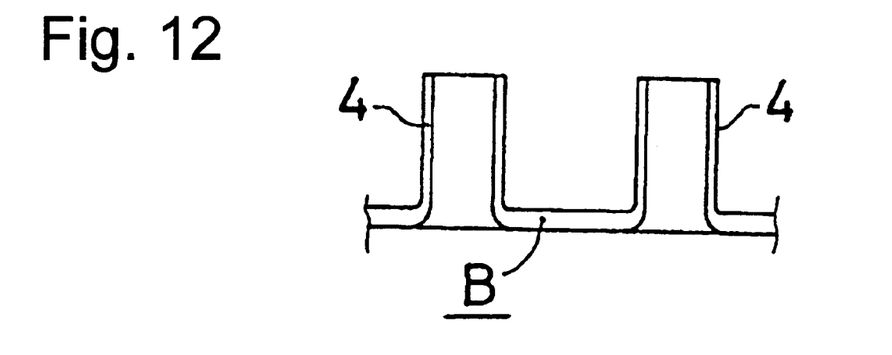
FIG. 12 is a partial longitudinal sectional view of the sheet metal in the transversal direction after the swelled portions are formed to be branch tubes.

Thereafter, the branch tubes 4 having desired shapes and dimensions are formed by conducting a burring process on the bored top ends of the swelled portions a as shown in FIG. 12. However, since the interval between the swelled portions a is set larger than the final interval, at this stage, the interval between the two rows of the branch tubes 4 is still larger than the final interval.

Figure 13:
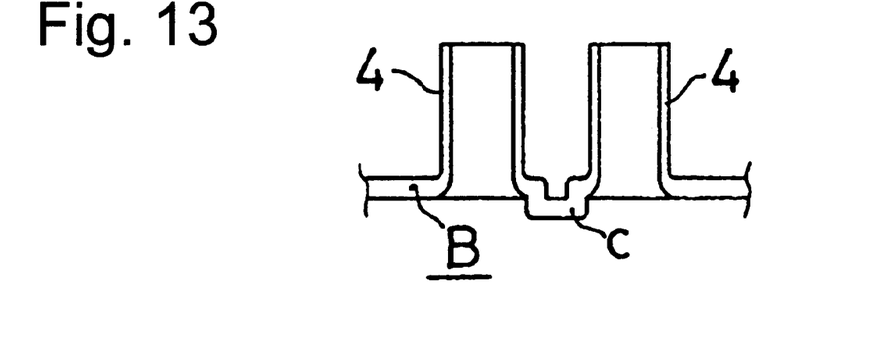
FIG. 13 is a partial longitudinal sectional view of the sheet metal of the transversal direction showing the process of reducing the distance between the adjacent branch tubes and increasing the thickness of this portion.

Next, the interval between the rows of the branch tubes 4 is reduced to a predetermined length, and the thickness of this portion is increased to create a thicker portion c by a bending process (thickness increasing process). The thicker portion c created by this process has a convex shape as shown in FIG. 13 which protrudes toward the backside of the sheet metal B.

Figure 14:
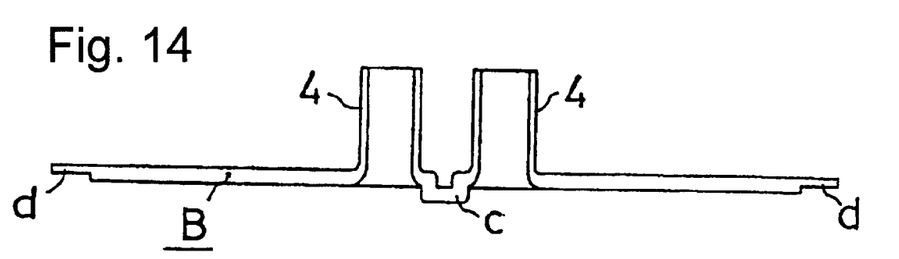
FIG. 14 is a partial longitudinal sectional view of the sheet metal in the transversal direction where both ends of the sheet metal are joggled.
Figure 15:
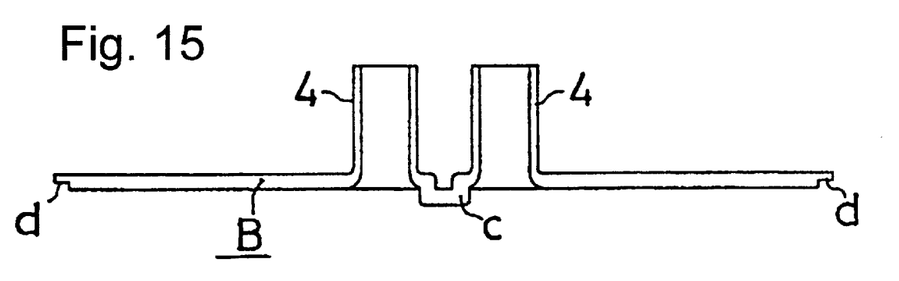
FIG. 15 is a partial longitudinal sectional view of the sheet metal in the transversal direction where the joggled portions of the sheet metal are trimmed.

Subsequently, in FIG. 14, joggled portions are created at both ends of the sheet metal B (right and left ends in FIG. 14) by a joggling process. Thereafter, trimming is conducted to the joggled portions d, to adjust the width dimension of the same as shown in FIG. 15.

Figure 16:
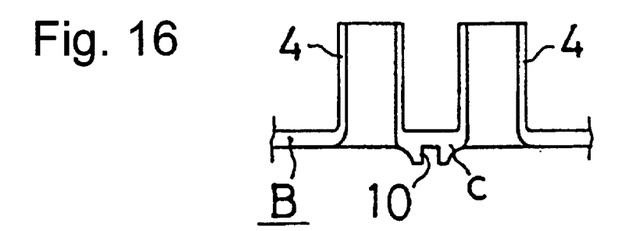
FIG. 16 is a longitudinal sectional view of the sheet metal in the transversal direction where a mating channel is created at the thickness increased position.

Further, a mating channel 10 for receiving therein the joggled potions d is created throughout the whole length of the backside of the thicker portion c as shown in FIG. 16. That can be done by conducting a beading process such that the thicker portion c is pressed upward (channel forming process).

Figure 17:
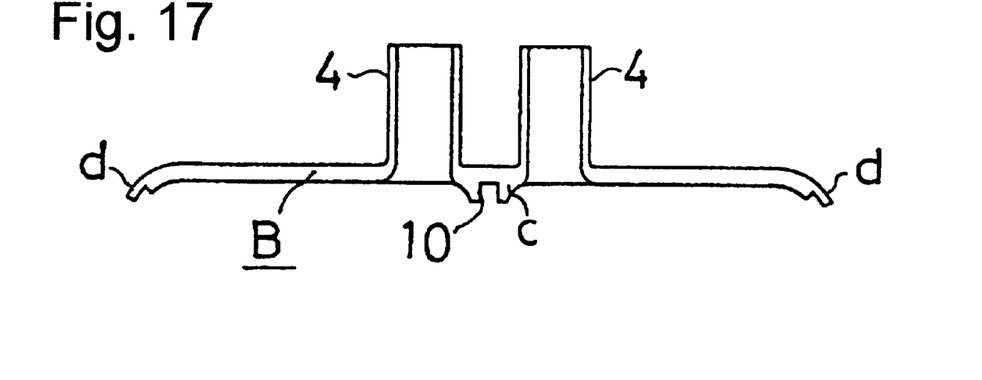
FIG. 17 is a partial longitudinal sectional view of the sheet metal in the transversal direction where the rounding process is conducted for both ends of the sheet metal.
Figure 18:
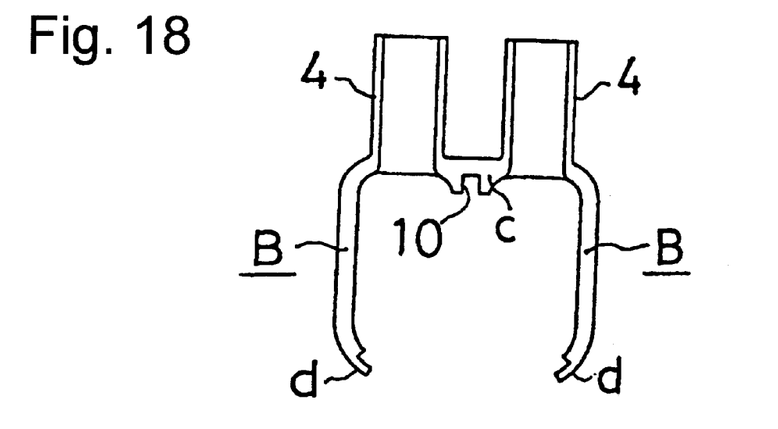
FIG. 18 is a partial longitudinal sectional view of the sheet metal in the transversal direction where the sheet metal is half rounded.
Figure 19:
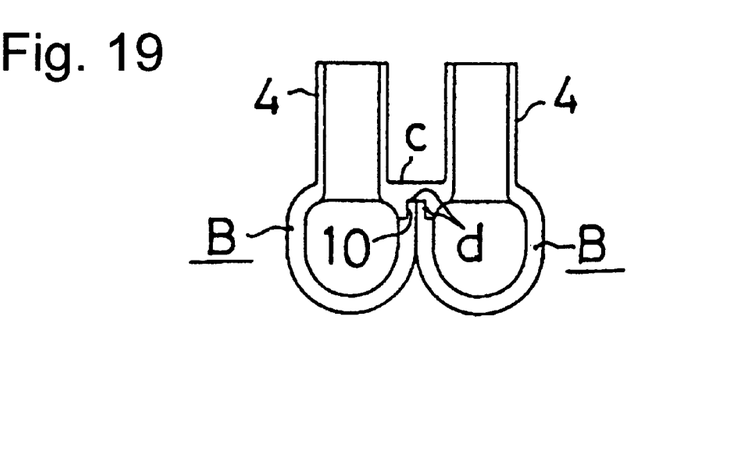
FIG. 19 is a partial longitudinal sectional view of the sheet metal in the transversal direction where both joggled ends of the sheet metal are fitted in the mating channel after the completion of the rounding process.

Then the process is advanced to a rounding process for the sheet metal B to produce the main tubular bodies 2 and 3. First, both ends of the sheet metal are bent toward the backside of the sheet metal B as shown in FIG. 17 (first rounding process). Thereafter, both portions at the outsides of the branch tubes 4 are bent almost perpendicularly toward the backside of the sheet metal B as shown in FIG. 18 (second rounding process). Further, both outside portions of the sheet metal B are respectively rounded inward and upward to form a cylindrical shape so that the joggled portions d created at each side of the sheet metal B are tightly fitted in the mating channel 10 (third rounding process). By going through the above steps, the formation of the main tubular body 1 of the distribution tank is completed.

Next, a plurality of dividers 8 for dividing the inner space of the main tubular bodies 2 and 3 into a plurality of compartments are created by a divider creating process.

Figure 20:
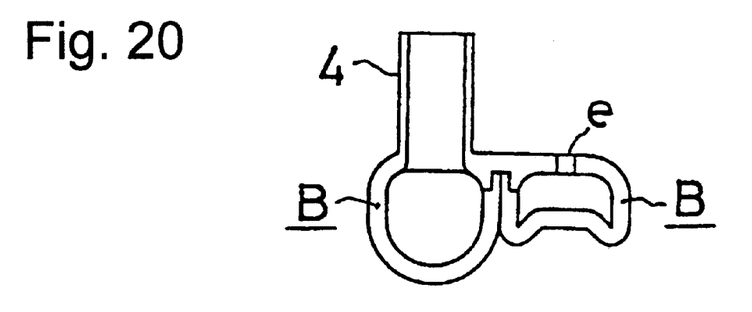
FIG. 20 is a partial longitudinal sectional view of the sheet metal in the transversal direction showing the process for creating the dividers inside of the main tubes.
Figure 21:
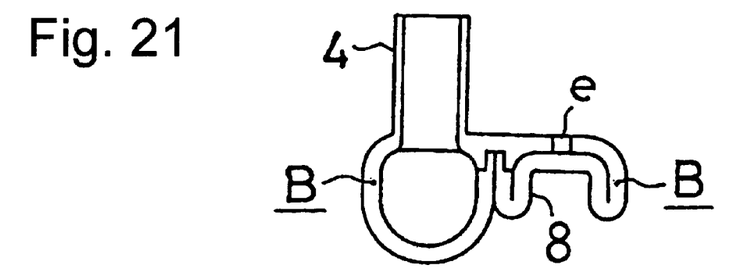
FIG. 21 is a partial longitudinal sectional view of the sheet metal in the transversal direction showing the situation where the process for creating the dividers has been completed.

The main tubes 2 and 3 are pressed at a plurality of predetermined positions to form the shape shown in FIGS. 4 and 21 by conducting a baffle process in several stages as shown in FIGS. 20 and 21. Then, small holes e are created at the upper wall of the main tubes of the pressed positions. The small holes e function to introduce the melted wax to the gaps at the positions of the dividers 8 during a brazing process as explained below.

Finally, the bottom face of the main tubes 2 and 3 provided at the opposite side of the protruding branch tubes 4 is made flat so that the distribution tank A can be easily assembled into the heat exchanger. Then, all of the steps in the deforming process are completed for the sheet metal B.

After the stopcocks 5 are inserted to each open end of the main tubes 2 and 3, the inlet joint 6 and the outlet 7 are fixed to the hole 9 and a snake tube (not shown) is connected to each branch tube 4. In this manner, the assembly process of the distribution tank A for a heat exchanger is completed.

To finalize the distribution tank, the brazing process is conducted to seal the gaps such as in the joint portions between the branch tubes 4, the snake tubes, dividers 8 and mating channel 10 by filling the melted wax.

Figure 22:
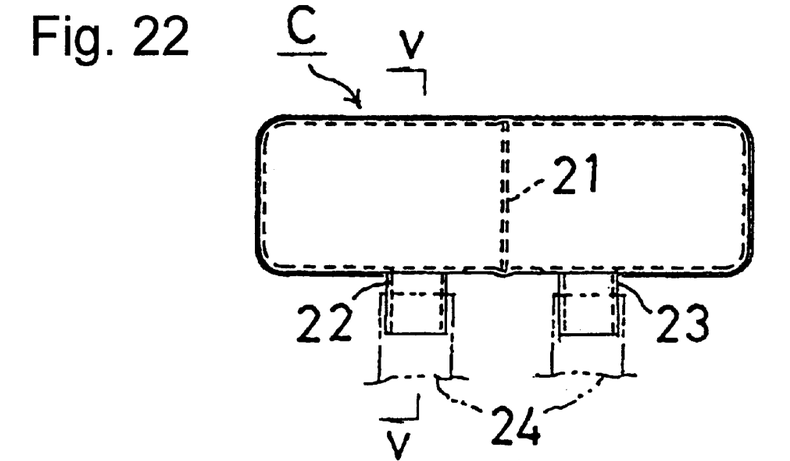
FIG. 22 is a top view of an upper tank showing another embodiment in which the present invention is applied to another type of heat exchanger of a car air conditioner.
Figure 23:
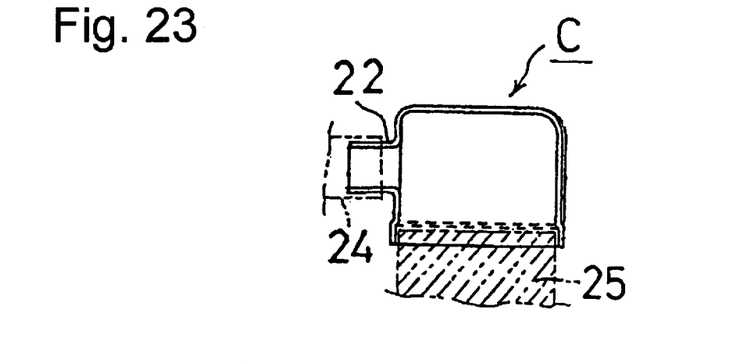
FIG. 23 is a longitudinal sectional view of the upper tank of the embodiment of FIG. 22 taken along the line V—V.

FIGS. 22 and 23 show another embodiment of the present invention being applied to an upper tank which constitute another type of heat exchanger.

The upper tank C is formed in a square pillar shape, and both ends of which are blocked. The inside cavity is divided into two compartments in the longitudinal direction by a dividing wall 21. The integral branch tubes 22 and 23 are provided at the side wall of each compartment. Hoses 24 are connected to the branch tubes 22 and 23 respectively in order to circulate the heat conductive medium.

FIG. 23 shows a heat exchange unit 25 which constitutes the main body of the heat exchanger. The upper tank C, without having a bottom face portion, is mated with the upper end of the heat exchange unit 25. Accordingly, the shape of the upper tank C is substantially a tubular shape which is square in cross section.

This upper tank C having integral branch tubes 22 and 23 are produced by conducting the press working of the present invention described above on a single sheet metal. During the course of this press working process, the process of forming the branch tubes 22 and 23 are almost the same as the process of forming branch tubes 4 on the distribution tank A. The shape of the tubular body formed by the present invention is not limited to that of the illustrated ones. By changing the shape of the mold to be used for the deformation process or changing the combination of a plurality of processes, the most appropriate shape for any of the particular application can be formed. The shape of the branch tubes 4 can be formed in the same manner.

Other examples of the tubular bodies which can be formed by the method of the present invention are a heat exchanger for cooling engine oil, a radiator, and a delivery pipe for fuel.

In other fields of industry, the present invention can be applied to the pipes having integral branch tubes for the distribution of various kind of fluid such as cooling medium of a room air conditioner.

What is claimed is:

1. A production method of a tubular body having integral branch tubes from a single sheet metal by deformation processing comprising:

a swelling step for creating a cylindrically swelled portion having a predetermined length and thickness, a top end of which being closed;

a boring step for boring said top end of said swelled portion;

a channel forming step for forming a mating channel extending in a longitudinal direction throughout the whole length of said sheet metal at an optional position in a transversal direction of said sheet metal a rounding step for rounding said sheet metal in the transversal direction to form a tubular body having a desired sectional shape;

a thickness increasing step for increasing the thickness of said sheet metal at the position where said mating channel is created; and a mating step for mating both ends of said rounded sheet metal with said mating channel thereby fixing the sectional shape of said tubular body.

2. The production method of claim 1, further comprising a divider creating step for creating dividers which divide a space in said tubular body into a plurality of compartments in the longitudinal direction by squeezing said tubular body at predetermined positions.

3. The production method of claim 2, wherein said thickness increasing step for increasing the thickness of said sheet metal is performed by pressing said sheet metal toward an inner direction thereof.

4. The production method of claim 3, further comprising a brazing step for sealing gaps at positions where the ends of the rounded sheet metal are mated with said mating channel and where the dividers are formed in said tubular body.

5. The production method of claim 2, further comprising a brazing step for sealing gaps at positions where the ends of the rounded sheet metal are mated with said mating channel and where the dividers are formed in said tubular body.

6. The production method of claim 1, wherein said thickness increasing step for increasing the thickness of said sheet metal is performed by pressing said sheet metal toward an inner direction thereof.

7. The production method of claim 6, further comprising a brazing step for sealing gaps at positions where the ends of the rounded sheet metal are mated with said mating channel.

8. The production method of claim 1, further comprising a brazing step for sealing gaps at positions where the ends of the rounded sheet metal are mated with said mating channel.

9. The production method of claim 1, wherein said mating channel is created at about the center of the sheet metal throughout the longitudinal direction thereof.

10. The production method of claim 1, wherein said swelling step is comprised of a plurality of drawing stages wherein selected parts of the sheet metal are drawn at one drawing stage by a degree different from that of the other drawing stage or stages.

11. The production method of claim 1, wherein said swelling step is comprised of a plurality of drawing stages wherein selected parts of the sheet metal are drawn at one drawing stage by a degree different from that of the other drawing stage or stages, and wherein a distance between the selected parts of the sheet metal is larger than a distance between the branch tubes that have been completed.

* * * * *